United States Patent [19]

Takahashi

[11] 4,419,261
[45] Dec. 6, 1983

[54] IMPREGNANT FOR MAKING SEMI-RIGID OR RIGID RESIN FOAMS

[75] Inventor: Nobuhiro Takahashi, Tajimi, Japan

[73] Assignee: Wako Kemikaru Kabushiki Kaisha, Aichi, Japan

[21] Appl. No.: 190,098

[22] Filed: Sep. 23, 1980

[51] Int. Cl.³ .............................................. C09K 3/00
[52] U.S. Cl. ..................................... 252/182; 521/53; 521/55; 521/137
[58] Field of Search ................... 252/182; 521/55, 53, 521/137

[56] References Cited

U.S. PATENT DOCUMENTS

| | | | |
|---|---|---|---|
| 4,184,022 | 1/1980 | Lawyer | 521/118 |
| 4,210,726 | 7/1980 | Hamamusa et al. | 252/182 X |
| 4,214,055 | 7/1980 | Seefnid et al. | 252/182 X |
| 4,239,642 | 12/1980 | DePaul et al. | 252/182 X |
| 4,247,655 | 1/1981 | Dunleavy et al. | 252/182 X |
| 4,258,140 | 3/1981 | Horacek et al. | 521/114 |

Primary Examiner—Josephine Barr
Attorney, Agent, or Firm—Wenderoth, Lind & Ponack

[57] ABSTRACT

An impregnant which is suitable for being applied to a once produced open-cellular, soft resin foam to change its physical properties to a desired extent depending on the purpose in end use, the impregnant comprising an isocyanate selected from 4.4'-diphenylmethanediisocyanate, tolylenediisocyanate or a mixture thereof admixed with a polyurethane prepolymer obtained by reacting an isocyanate selected from tolylenediisocyanate, 4.4'-diphenylmethanediisocyanate or a mixture thereof with a polyol, and optionally a solvent for the mixture in suitable amounts.

21 Claims, 4 Drawing Figures

IMPREGNANT FOR MAKING SEMI-RIGID OR RIGID RESIN FOAMS

BACKGROUND OF THE INVENTION

1. Field of the Invention

This invention relates to resin foams and more particularly, to an impregnant which is suitably applied to open-cellular, soft resin foams which have been previously produced by any of known methods so as to impart desired physical properties to the resin foams.

2. Prior Art

Several methods of producing semi-rigid and rigid resin foams are known including a mechanical foaming method, a soluble matter mixing method, a gas pressure utilizing method, a foaming agent utilizing method and the like.

All of these methods are those in which resin foams are obtained to have a semi-rigidity or rigidity within a predetermined range. In order to obtain a product of desired properties it is essential to use a specific type of starting materials and a specific production process which depend on the type of a final product.

Accordingly, it is difficult to stepwise obtain from products of different degrees of rigidity which are intermediate between those of a semi-rigid product and a rigid product, so that their physical properties are naturally limited and thus a wide variety of foam products could not be obtained. In addition, rigid resin foams have never been produced in the form of open cells.

SUMMARY OF THE INVENTION

It is an object of the present invention to provide an impregnant which is useful in changing the physical properties such as the rigidity of an open-cellular, soft resin foam which has been previously produced.

It is another object of the present invention to provide an impregnant which permits easy forming of a resin foam on reaction of the impregnant.

It is a further object of the invention to provide an impregnant which also serves as an adhesive whereby a foam can be shaped in a desired form simultaneously with adhesion to other materials.

It is a still further object of the invention to provide an impregnant for semi-rigid or rigid resin foams by which the productivity of such foams is improved and the cost therefor is saved.

The above objects can be achieved by an impregnant according to the invention which comprises a mixture of an isocyanate selected from the group consisting of 4.4'-diphenylmethanediisocyanate (hereinafter referred to simply as "MDI"), tolylenediisocyanate (hereinafter referred to simply as "TDI") and a mixture thereof, and a polyurethane prepolymer obtained by reacting an isocyanate selected from the group consisting of TDI, MDI and a mixture thereof with a polyol. All the mixing ratio of the isocyanate and the prepolymer may be usable in the range of from (0):(10) to (10):(0).

In other words, the isocyanate and the prepolymer may be used singly or in combination so as to impart desired properties to a resin foam.

The impregnant may further comprise a solvent for the mixture in suitable amounts.

Other objects, features and advantages of the present invention will be understood from the description which follows.

EMBODIMENTS OF THE INVENTION

Figure 1:
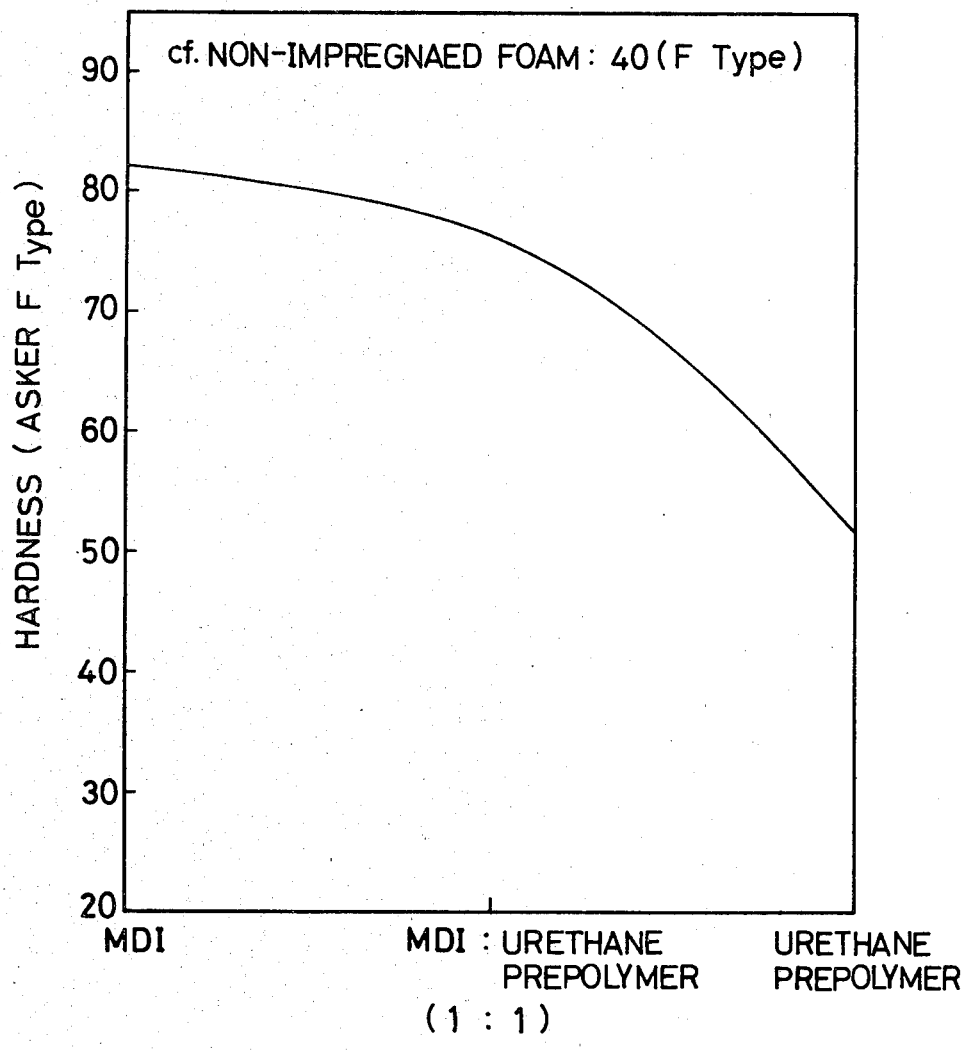
FIG. 1 is a graph of the rigidity of a resin foam in relation to the variation in composition of a mixture of a polyurethane prepolymer and MDI.

In the practice of the invention, a soft resin foam of open cells which has been previously produced is converted into a semirigid or rigid resin foam having desired physical properties including hardness, tensile strength, elongation, resilience and the like. For this purpose, we have studied various impregnants by which the above requirements have been satisfied. That is, isocyanates are used to impart a hardness to the resin foam and a polyurethane prepolymer of a specific type is used to impart an elongation and an impact resilience to the resin foam.

The impregnant composition according to the invention comprises an isocyanate and a polyurethane prepolymer in a suitable mixing ratio. The isocyanate useful in the invention includes "MDI", "TDI" or a mixture thereof. These isocyanates form a urea bonding by reaction with water and this urea bonding is predominantly composed of a hydrogen bond distribution by which a strong crosslinkage is ensured and can thus impart excellent physical properties to a resin foam as rigid segments. The isocyanates used in the present invention which are "MDI," "TDI" and a mixture thereof as mentioned above have advantages that they are more inexpensive than other isocyanates and that they are more reactive. These isocyanates have further advantages that they are generally lower in viscosity than other thermosetting resins and react readily and rapidly with moisture.

The polyurethane prepolymer to be the other component of the impregnant according to the invention should have a low content of NCO groups and is one which is obtained by reacting, with a polyol, an isocyanate selected from the group consisting of TDI, MDI and a mixture thereof.

As a matter of course, the properties of the polyurethane prepolymer are affected by the type of isocyanate and polyol used as the starting materials. In this connection, however, since the type of the isocyanate is limited to MDI or TDI in the practice of the invention, the properties are greatly varied depending on the type of polyol. In other words, the molecular weight and the number of functional groups of the polyol give a great influence on the properties of a final polyurethane prepolymer. In order to produce a polyurethane prepolymer which is a rubbery elastomer after its hardening by reaction with moisture, the polyol used has generally the number of functional groups ranging 2–4 and a molecular weight of about 1500–4000 and a content by % of free NCO groups in the polyurethane prepolymer should be suppressed to a level below about 15%.

The reason why a polyol is used is due to a fact that when the isocyanate and a polyol are reacted to form a urethane bond, the degree of branching and molecular weight are so controlled that the urethane bonds develop high elastic characteristics. In addition, the reason why the content of NCO groups to be a reactive group of the polyurethane prepolymer is suppressed to a low level of below 15% is that the urethane bonds which can impart the high elastic characteristics to the prepolymer are made great in number and the prepolymer is rendered high in elasticity after having been thermally set.

The impregnant of the invention is obtained by providing a polyurethane prepolymer which is a rubber-like elastomer after cure and admixing the prepolymer with an isocyanate taken from TDI, MDI or a mixture thereof which serves to impart rigidity to resin foams, in a suitable amount which varies depending on the intended properties of a final product.

The contents by % of NCO groups of the starting materials are indicated in Table 1 below.

TABLE 1

| | Molecular Formula | Molecular Weight | % of Free NCO |
|---|---|---|---|
| Pure MDI | 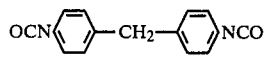 | 250 | 34 |
| Crude MDI | 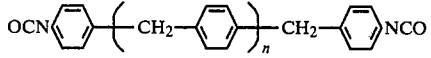 | — | 30 |
| TDI | 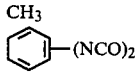 | 174 | 49 |
| Urethane prepolymer | — | — | 3 |

The change in composition of the impregnant is as shown in Table 2.

TABLE 2

| | | | unit: % | | |
|---|---|---|---|---|---|
| Type | Sample No. | Isocyanate: prepolymer | Crude MDI | TDI | MDI + TDI |
| Highly elastic | ac-0 | 0:10 | 3 | 3 | 3 |
| | ac-1 | 1:9 | 5.7 | 7.6 | 6.65 |
| | ac-2 | 2:8 | 8.4 | 12.2 | 10.3 |
| Semi-rigid | ac-3 | 3:7 | 11.1 | 16.8 | 13.95 |
| | ac-4 | 4:6 | 13.8 | 21.4 | 17.6 |
| | ac-5 | 5:5 | 16.5 | 26.0 | 21.25 |
| | ac-6 | 6:4 | 19.2 | 30.6 | 24.9 |
| | ac-7 | 7:3 | 21.9 | 35.2 | 28.55 |
| Rigid | ac-8 | 8:2 | 24.6 | 39.8 | 32.2 |
| | ac-9 | 9:1 | 27.3 | 44.4 | 35.85 |
| | ac-10 | 10:0 | 30 | 49 | 39.5 |

As will be seen from the above tables, the impregnant of the invention with different mixing ratios ranging 0:10 to 10:0 can be obtained. In order not only to lower a viscosity of the impregnant so as to facilitate its impregnation into a resin foam, but also to permit the resin foam to be swollen and the mixture of the polyurethane prepolymer and MDI, TDI or a mixture thereof to be readily, rapidly and uniformly infiltrated into the cells of the resin foam, it is preferable to add a solvent to the impregnant components. Examples of such solvent include aromatic hydrocarbon compounds such as benzene, toluene, xylene, chlorobenzene and the like, aliphatic hydrocarbon compounds such as normal hexane, chlorine-containing compounds such as methylene chloride, 1,1,1-trichloroethane, propylene dichloride, and the like, esters such as ethyl acetate, butyl acetate and the like, and ketones such as acetone, methyl ethyl ketone and the like.

These solvents may be used singly or in combination. The amount of the solvent is not critical but is preferably determined in such a way that the viscosity of the impregnant is below 500 cps on application.

In practice, an impregnant which is a mixture of the urethane prepolymer and, for example, MDI in such a mixing ratio which varies depending on the desired properties after cure of a resin foam product obtained by hot press is provided and mixed with a solvent, if necessary. This impregnant is impregnated into a soft urethane foam board or the like and an excess of the impregnant is squeezed out by means of rollers, after which the impreganated board is slightly heated to vaporize the solvent, thus permitting the impregnant to be uniformly deposited on the inner walls of the cells of the urethane foam.

The thus treated urethane foam is then placed in a mold and heated by application of steam whereupon the reaction takes place to complete the molding operation. Where a molding article is made by an ordinary foaming method, it takes ten minutes or more. In this connection, however, the molding time is about 2 minutes in the practice of the invention and the production speed is thus very high. In addition, a molding having a very thin portion and an elongated portion may be readily made when using the impregnant of the invention. Further, the use of the impregnant is advantageous in that when it is desired to form a decorative covering on the surface of a molding, a decorative laminate molding can be made without use of any adhesive by providing such covering on the surface prior to the molding reaction and then placing it in a mold.

The variation in hardness of an impregnated foam is shown in FIG. 1 in relation to a variation in a mixing ratio of "MDI" to the urethane prepolymer. In the figure, the content of "MDI" is 100% at the left end of the abscissa, the content of the urethane prepolymer is 100% at the right end, and the mixing ratio of "MDI" to the urethane prepolymer is 1:1, i.e. the "MDI" and the urethane prepolymer are in equal amounts at the central point. The ordinate indicates a scale of hardness of the ASKER-F type. From the figure it will be seen that larger amounts of "MDI" result in higher hardness.

Figure 2:
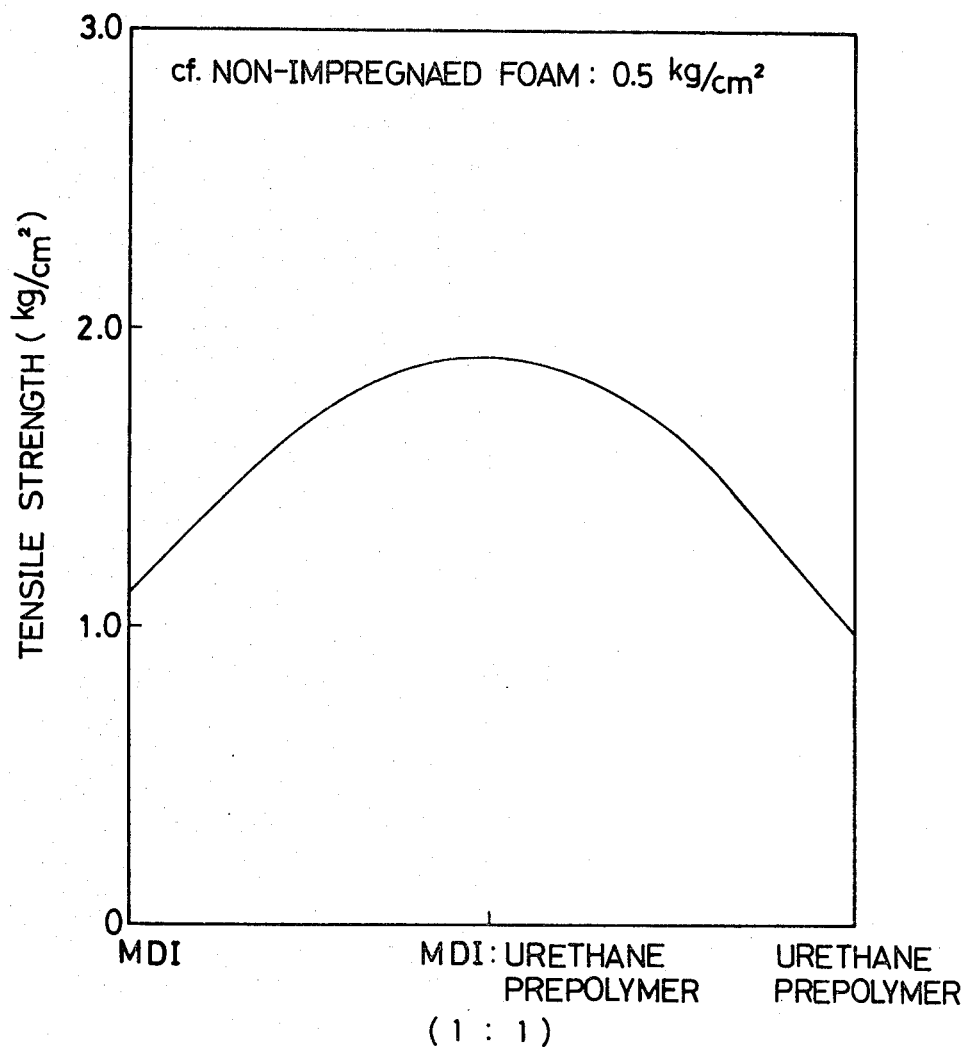
FIG. 2 is a graph of the tensile strength of a resin foam in relation to the variation in composition of a mixture of a polyurethane prepolymer and MDI.

FIG. 2 shows the variation in tensile strength of an impregnated foam in relation to variation in the mixing ratio of the urethane prepolymer and "MDI" of the impregnant of the invention, in which in the abscissa the content of "MDI" is 100% at the left end and the content of the urethane prepolymer is 100% at the right end and the ordinate indicates a tensile strength expressed by kg/cm².

Figure 3:
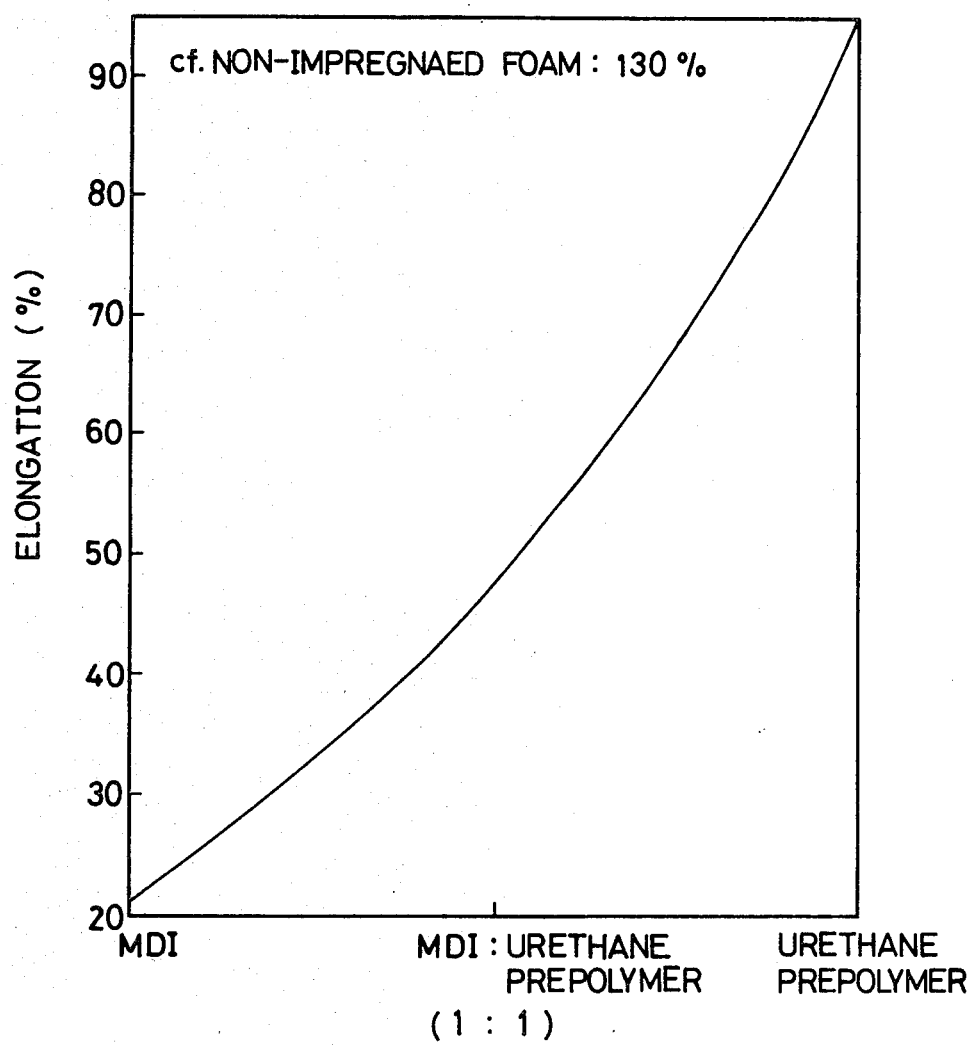
FIG. 3 is a graph of the elongation of a resin foam in relation to the variation in composition of a polyurethane prepolymer and MDI.

FIG. 3 shows the elongation of an impregnated foam in relation to the variation in the mixing ratio of the urethane prepolymer and "MDI" of the impregnant of the invention in which in the abscissa a content of "MDI" is 100% at the left end and the content of the urethane prepolymer is 100% at the right end and the ordinate is an elongation by %. From the figure it will be clear that the curve is substantially a straight line where it extends from about 20% on the left end toward 95% on the right end. The increase in the amount of the "MDI" results in a resin foam which is more fragile.

Figure 4:
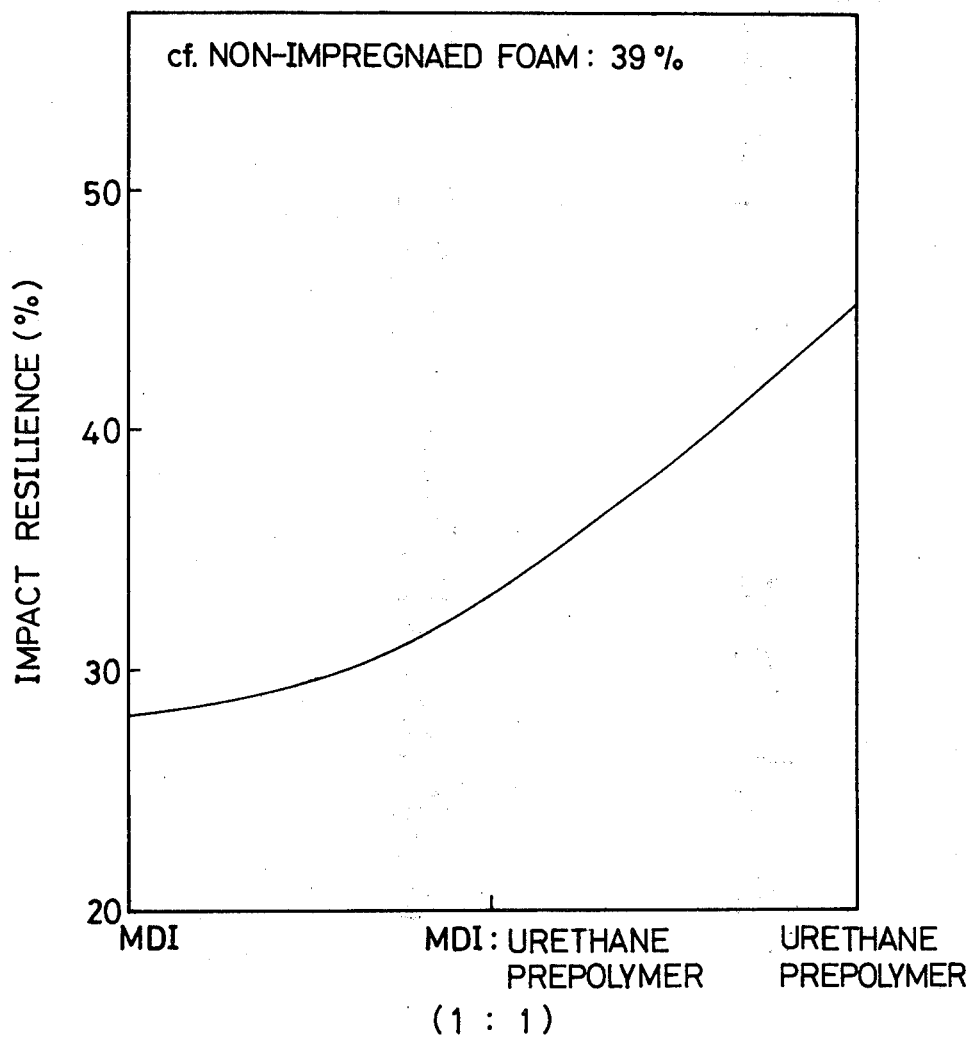
FIG. 4 is a graph of the resilience of a resin foam in relation to the variation in composition of a mixture of a polyurethane prepolymer and MDI.

FIG. 4 shows the variation in the resilience of an impregnated foam in relation to variation in a mixing ratio of the urethane prepolymer and "MDI" constituting an impregnant of the invention. In the abscissa of the figure, the content of "MDI" is 100% at the left end, the content of the urethane prepolymer is 100% at the right end, and the mixing ratio is 1:1 at the central point, and in the ordinate, the impact resilience is indicated by percent. The impact resilience curve gradually increases in the range of a lower MDI content and then sharply increases with a decrease of the MDI content. That is, there is the tendency that when the content of "MDI" is larger in content, the resin foam becomes harder and more fragile, or the impact resilience increases with an increase in the content of the urethane prepolymer.

From the figure it will be understood that the tensile strength is in a maximum at a mixing ratio of 1:1 where the hardness and the elongation are counterbalanced.

In the practice of the invention, a resin foam product having the required physical properties can be readily made on the spot by changing the mixing ratio of the starting material and the amount of impregnant.

The physical properties such as the hardness of the resin foam molded article can be arbitrarily changed since the urethane prepolymer which is obtained by reacting a specified isocyanate "TDI" with a polyol in such a way that a content by percent of the NCO groups in the prepolymer is in such a small amount of below 15% is provided and then admixed, on the spot, with "MDI" or other isocyanate in an amount which depends on the physical properties desired. Accordingly, only one type of urethane prepolymer is sufficient to give resin foam molded articles of different physical properties.

The impregnant of the invention has been described with reference to resin foams having open cells, but may be applied, as it is, to other articles such as felt, non-woven fabric, palm rock, glass wool and the like to show an effect as will be expected for resin foams.

I claim:

1. An impregnant for converting a soft resin foam of open cells to a semi-rigid or rigid resin foam consisting essentially of an isocyanate selected from the group consisting of 4.4'-diphenyl-methanediisocyanate, tolylenediisocyanate and a mixture thereof, and a polyurethane prepolymer obtained by reacting an isocyanate selected from the group consisting of tolylenediisocyanate, 4.4'-diphenylmethanediisocyanate and a mixture thereof with a polyol having a molecular weight of about 1500–4000 and 2–4 functional groups in such proportions that the content of NCO groups in the prepolymer is in the range of below 15%, and wherein the mixing ratio of the first-mentioned isocyanate to the prepolymer is in the range of 1:9 to 9:1 and an organic inert solvent mixed therewith, said solvent selected from the group consisting of aromatic hydrocarbons, aliphatic hydrocarbons, chlorinated hydrocarbons, esters of hydrocarbons and ketones of hydrocarbons, said organic inert solvent being mixed in such a manner that the viscosity of the thus-diluted impregnant is below 500 cps.

2. The impregnant according to claim 1, wherein the first-mentioned isocyanate is 4.4'-diphenylmethanediisocyanate and the prepolymer is a reaction product of tolyene diisocyanate and said polyol.

3. The impregnant according to claim 1, wherein the first-mentioned isocyanate is 4.4'-diphenylmethanediisocyanate and the prepolymer is a reaction product of 4.4'-diphenylmethanediisocyanate and said polyol.

4. The impregnant according to claim 1, wherein the first-mentioned isocyanate is 4.4'-diphenylmethanediisocyanate and the prepolymer is a reaction product of the mixture of tolylenediisocyanate and 4.4'-diphenylmethanediisocyanate and said polyol.

5. The impregnant according to claim 1, wherein the first-mentioned isocyanate is tolylenediisocyanate and the prepolymer is a reaction product of tolylenediisocyanate and said polyol.

6. The impregnant according to claim 1, wherein the first-mentioned isocyanate is tolylenediisocyanate and the prepolymer is the reaction product of 4.4'-diphenylmethane diisocyanate and said polyol.

7. The impregnant according to claim 1, wherein the first-mentioned isocyanate is tolylenediisocyanate and the prepolymer is a reaction product of a mixture of tolylenediisocyanate and 4.4'-diphenylmethanediisocyanate and said polyol.

8. The impregnant according to claim 1, wherein the first-mentioned isocyanate is a mixture of tolylenediisocyanate and 4.4'-diphenylmethanediisocyanate and the prepolymer is a reaction product of tolylenediisocyanate and said polyol.

9. The impregnant according to claim 1, wherein the first-mentioned isocyanate is a mixture of tolylenediisocyanate and 4.4'-diphenylmethanediisocyanate and the prepolymer is the reaction product of 4.4'-diphenylmethanediisocyanate and said polyol.

10. The impregnant according to claim 1, wherein the first-mentioned isocyanate is a mixture of tolylenediisocyanate and 4.4'-diphenylmethanediisocyanate and the prepolymer is a reaction product of a mixture of tolylenediisocyanate and 4.4'-diphenylmethanediisocyanate and said polyol.

11. A solvent according to claim 1 selected from the group consisting of benzene, toluene, xylene, chlorobenzene, normal hexane, methylene chloride, 1,1,1-trichloroethane, propylene dichloride, ethyl acetate, butyl acetate, acetone and methyl ethyl ketone.

12. An impregnant according to claim 1 in which a mixture of the ratio of the first mentioned isocyanate to the prepolymer is 1:9.

13. An impregnant according to claim 1 in which a mixture of the ratio of the first mentioned isocyanate to the prepolymer is 2:8.

14. An impregnant according to claim 1 in which a mixture of the ratio of the first mentioned isocyanate to the prepolymer is 3:7.

15. An impregnant according to claim 1 in which a mixture of the ratio of the first mentioned isocyanate to the prepolymer is 4:6.

16. An impregnant according to claim 1 in which a mixture of the ratio of the first mentioned isocyanate to the prepolymer is 5:5.

17. An impregnant according to claim 1 in which a mixture of the ratio of the first mentioned isocyanate to the prepolymer is 6:4.

18. An impregnant according to claim 1 in which a mixture of the ratio of the first mentioned isocyanate to the prepolymer is 7:3.

19. An impregnant according to claim 1 in which a mixture of the ratio of the first mentioned isocyanate to the prepolymer is 8:2.

20. An impregnant according to claim 1 in which a mixture of the ratio of the first mentioned isocyanate to the prepolymer is 9:1.

21. A soft resin foam having open cells in its structure impregnated with the impregnant of any of claims 1, or 12–20.

* * * * *